United States Patent [19]

Bhatia et al.

[11] Patent Number: 5,536,780

[45] Date of Patent: Jul. 16, 1996

[54] PROCESS FOR THE MANUFACTURE OF LOW GLOSS RESINS

[75] Inventors: Qamar Bhatia, Albany, N.Y.; Jack Hill, Vienna, W. Va.; Robert Hossan, Albany; William Pecak, Cohoes, both of N.Y.; Robert Wildi, Parkersburg, W. Va.

[73] Assignee: General Electric Company, Pittsfield, Mass.

[21] Appl. No.: 110,142

[22] Filed: Aug. 20, 1993

[51] Int. Cl.$^6$ ............ C08L 69/00; C08L 33/20; C08L 25/12; C08J 3/22

[52] U.S. Cl. ............ 525/65; 525/67; 525/108; 525/109; 525/113; 525/146; 523/351

[58] Field of Search ............ 525/65, 67, 108, 525/122, 146, 109, 113

[56] References Cited

U.S. PATENT DOCUMENTS

| | | | |
|---|---|---|---|
| 3,923,922 | 12/1975 | Grant | 525/122 |
| 4,000,216 | 12/1975 | Lang . | |
| 4,387,179 | 6/1983 | Sun | 524/458 |
| 4,526,926 | 7/1985 | Weber et al. | 525/67 |
| 4,554,316 | 11/1985 | Sakano et al. | 525/71 |
| 4,624,986 | 11/1986 | Weber et al. | 525/67 |
| 4,683,265 | 7/1987 | Kress et al. | 525/67 |
| 4,742,104 | 5/1988 | Lindner et al. | 525/67 |
| 4,885,335 | 12/1989 | Gallucci et al. | 525/67 |
| 4,898,911 | 2/1990 | Miyashita et al. | 525/74 |
| 4,902,743 | 2/1990 | Boutni | 525/67 |
| 4,906,689 | 3/1990 | Boutni | 525/67 |
| 5,026,777 | 6/1991 | Jalbert et al. | 525/67 |
| 5,061,754 | 10/1991 | Dufour et al. | 525/67 |
| 5,104,935 | 4/1992 | Leitz et al. | 525/67 |
| 5,130,374 | 7/1992 | Cozens et al. | 525/239 |

FOREIGN PATENT DOCUMENTS

| | | |
|---|---|---|
| 306103 | 3/1989 | European Pat. Off. ............ 525/122 |
| 0330153 | 8/1989 | European Pat. Off. . |
| 0352822 | 1/1990 | European Pat. Off. . |
| 0375648 | 6/1990 | European Pat. Off. . |

OTHER PUBLICATIONS

Matthews, *Polymer Mixing Technology*; 1982; pp. 225–226.
Tadmor, *Principles of Polymer Processing*; 1979; p. 438.
A New Reaction of Nitriles. I. Amides from Alkenes and Mononitriles by John J. Ritter and P. Paul Minieri, New York University, vol. 70, pp. 4045–4048.

*Primary Examiner*—David Buttner

[57] ABSTRACT

A process for making reduced gloss thermoplastic resin compositions is provided. The process involves compounding a nitrile polymer with an electrophilic reagent to form a polymeric gel compound, blending the polymeric gel compound with a first thermoplastic resin and a weight ratio of between 5:1 and 0.5:1 to make a concentrate comprising gels dispersed in the first thermoplastic resin, and admixing the concentrate with a second thermoplastic resin produced the desired composition, wherein the concentrate is used at a level of from 2 to 60 percent by weight based on the total weight of the composition. The process provides improved product consistency, and consistently yields a product exhibiting reduced gloss and high levels of impact strength with a uniformly dispersed concentration of polymeric gels therein. The compositions are useful in making molded articles exhibiting consistent reduced gloss and high impact strengths.

11 Claims, 1 Drawing Sheet

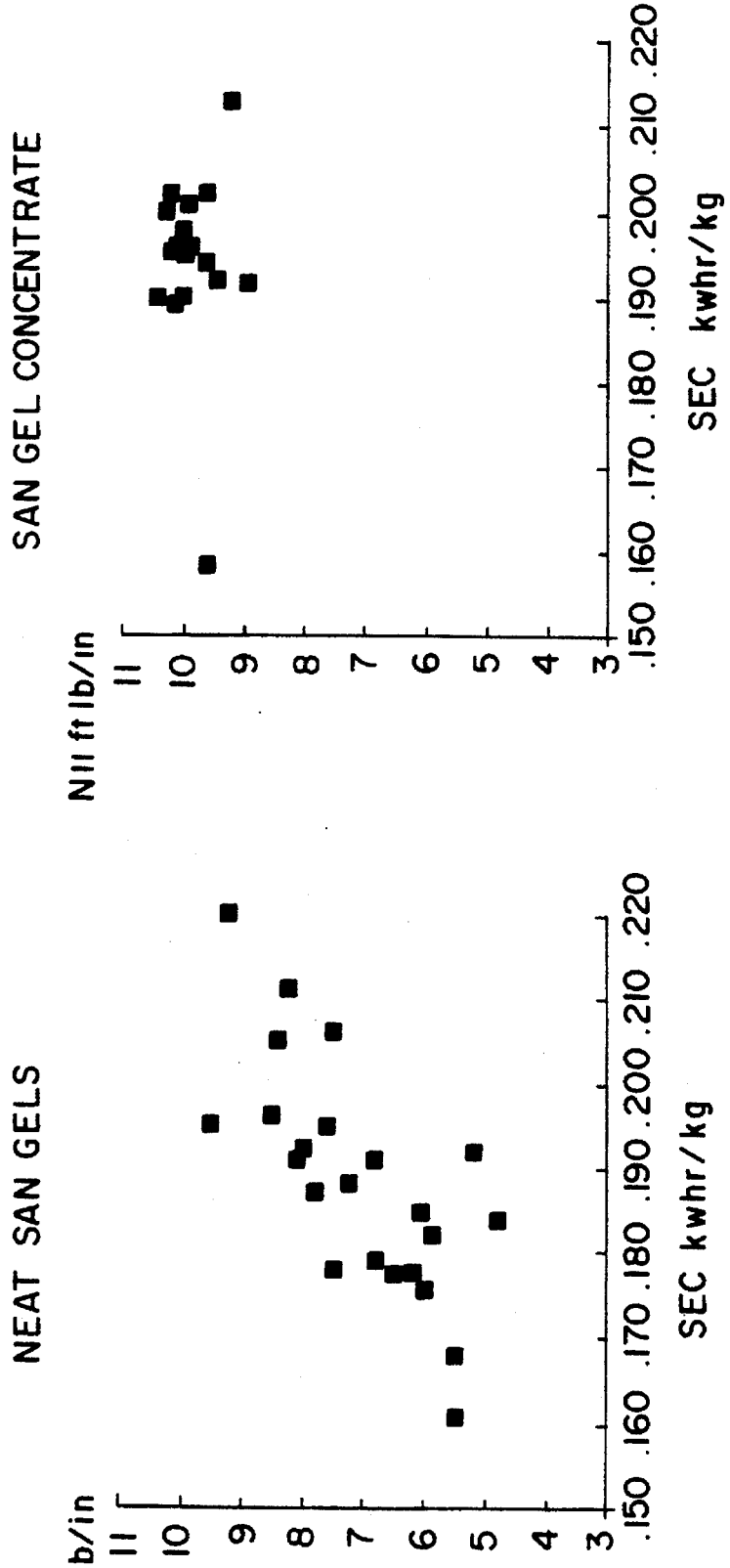

PROCESS FOR THE MANUFACTURE OF LOW GLOSS RESINS

BACKGROUND OF THE INVENTION

1. Field of the Invention

The present invention relates to processes for making reduced gloss thermoplastic compositions, and more particularly relates to a process for producing reduced gloss thermoplastic compositions having improved impact strengths, gloss levels, and flammability ratings.

2. Description of the Related Art

Low gloss compositions comprising a polymer blend of a polycarbonate and an emulsion grafted ABS polymer, and a low gloss enhancing amount of a polyepoxide are known. See Jalbert et al. U.S. Pat. No. 5,026,777 which is incorporated herein by reference. A single step compounding process can result in undesired side reactions, including side reactions of the polyepoxide with additional ingredient such as phosphite stabilizers and some organic and metal pigments which may affect product consistency and quality. Also, in general, a single step compounding processes as set out in Jalbert exhibit consistency problems in obtaining consistent combinations of desired levels of low gloss and high impact strength, as well as other properties.

Attempts to overcome some of these problems include pending U.S. applications (1) Wildi et al., U.S. patent application Ser. No. 07/951600, filed Sep. 28, 1992, entitled Process Improvement for Improved Color Reduced Gloss Thermoplastic Compositions which involve compounding an acrylonitrile polymer with an electrophilic reagent to form polymeric gels and admixing an effective amount of water with the polymeric gels sufficient to reduce the yellowness index of the gels, and blending an effective gloss reducing amount of the reduced color gels with a thermoplastic resin; and (2) Wildi et al., U.S. patent application Ser. No. 07/841,141, filed Feb. 25, 1992, titled Reduced Gloss Thermoplastic Compositions and Processes for Making Thereof, which involves compounding an acrylonitrile polymer with an electrophilic reagent to form polymeric gels, and blending an effective gloss reducing amount of the gels with a thermoplastic resin. These prior U.S. applications set out solutions to some of the problems encountered in the single step process set out in Jalbert et al., U.S. Pat. No. 5,026,777, but a problem still exists in the inconsistency of producing a product having adequate physical properties such as surface gloss and impact strength.

Consequently, there is a need to provide a process which provides a consistent dispersion of the gels in the matrix resin, and thereby provides a consistently low gloss and consistently high impact strength in the final composition.

BRIEF DESCRIPTION OF THE DRAWINGS

FIG. 1 is a chart showing improved consistency obtained by the process of the present invention.

SUMMARY OF THE INVENTION

The present invention is directed to a process for making a reduced gloss thermoplastic composition by making a concentrate comprising nitrile polymer gels dispersed in a first thermoplastic resin, and then admixing the concentrate with a second thermoplastic resin to produce the composition. The present process provides an unexpected lowering of gloss, increased impact strength and enhanced flammability rating on average.

DETAILED DESCRIPTION OF THE INVENTION

A process is provided for making a reduced gloss thermoplastic composition, wherein the process involves (a) compounding a nitrile polymer with an electrophilic reagent to form a polymeric gel compound; (b) blending the polymeric gel compound with a first thermoplastic resin in a weight ratio of between 5:1 and 0.5:1 to make a concentrate comprising gels dispersed in the first thermoplastic resin; and (c) admixing the concentrate with a second thermoplastic resin producing a composition, the concentrate being used at a level of from 2 to 60 weight percent based on the total weight of the composition.

The compounding may involve employing a reactive extrusion process wherein the electrophilic reagent and the nitrile polymer are intimately combined under elevated temperature and low to moderate retention times to produce the desired polymeric gel compound containing nitrile polymeric gels. The compounding may be accomplished with an extruder suitable for reactive extrusion, and is preferably done at a temperature range of from 450° F. to 700° F. and retention time between 10 seconds and 10 minutes.

The blending step involves melt mixing of a first thermoplastic resin with the polymeric gel compound in an extruder, internal mixer, Kneader, or other equipment well known upon the plastics processing art. The steps of compounding and blending may be done continuously by first extrusion reacting the nitrile polymer and electrophilic reagent to form the polymeric gel compound in a reaction zone of a reactive extruder, and then adding the first thermoplastic resin to the reactive extruder after the reaction zone. By combining the compounding and blending within a single reactor, the process can eliminate a need for a die face pelletizer between the compounding and blending steps.

The nitrile polymer comprises at least 5 percent by weight of an unsaturated nitrile monomer based on the total weight of the nitrile polymer, more preferably at least 15 percent by weight thereof, and most preferably at least 19 percent by weight thereof. The unsaturated nitrile monomer is preferably selected from the group consisting of substituted and unsubstituted acrylonitrile monomers. The term nitrile polymer is meant to include homopolymers and copolymers of unsaturated nitrile monomers. Such nitrile polymers may be prepared by emulsion, bulk, suspension, bulk-suspension or solution polymerization methods which are known in the art. Suitable nitrile polymers include, for example, styrene-acrylonitrile copolymer and alphamethyl styrene-acrylonitrile copolymers. Suitable unsaturated nitrile monomers include, for example, acrylonitrile, methacrylonitrile, and fumarontrile. The nitrile polymers may be based on one or more of the following: acrylonitrile or substituted acrylonitrile either alone or in combination with monovinyl aromatic compounds, methylcrylic acid esters of $C_1$–$C_4$ aliphatic alcohols, and imides to maleic anhydride derivatives which are unsubstituted or substituted with an alkyl or aryl group. More specifically the nitrile polymers may be copolymers of acrylonitrile or substituted acrylonitrile with one or more of the $C_1$–$C_4$ acrylates, maleimides, styrene and/or alphamethyl styrene. The nitrile copolymers may also be rubber modified, for example, acrylonitrile-butadiene-styrene graft copolymers, acrylonitrile-ethylacrylate-styrene graft copolymers, and rubber modified acrylonitrile-styrene-butylacrylate rubber resins. Preferably the nitrile polymer used in formation of the gel compound is free of rubber. The electrophilic reagent is preferably a polyepoxide in combination with an acid, but other electrophilic reagents include acid catalysts such as organic acids, phosphonic acid, ammonium salts, organic titanates, sulphuric acids, mineral acids, $BF_3$, amines, and Lewis acids such as zinc halides such as zinc chloride. The polyepoxides are preferably diepoxides. Various diepoxides which are useful in the present invention are described in U.S. Pat. No. 2,890,209. The diepoxides may be prepared by the catalytic esterification of 3,4-epoxycyclohexylmethyl 3,4-epoxycyclohexanecarboxylates and have the general formula:

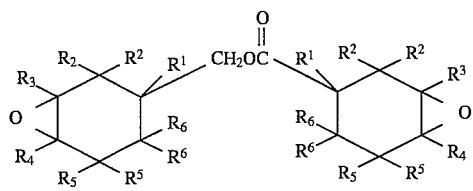

wherein $R^1$, $R^2$, $R^3$, $R^4$, $R^5$, and $R^6$ represent members selected from the group consisting of hydrogen and lower alkyl groups containing one to four carbon atoms. When any of $R_1$ through $R^6$ represent alkyl groups and particularly the lower alkyl groups, a preferred class of diepoxides are those wherein the total number of carbon atoms contained in the alkyl groups does not exceed twelve. A particularly preferred class of compounds represented by the general formula above are those wherein $R_1$ through $R^6$ represent members selected from the group consisting of hydrogen and methyl groups. Polymers and particularly the homopolymers made from diepoxide monomers and mixtures thereof having not more than three alkyl substituents per carbocyclic ring are preferred.

The diepoxides represented by the above formula can be conveniently prepared by reacting a selected 3-cyclohexenyl-methyl-3-cyclohexenecarboxylate with peracetic acid. The 3-cyclohexenyl-methyl-3-cyclohexenecarboxylates, in turn, are readily prepared by reacting a selected 3-cyclohexenecarboxy aldehyde in the presence of an aluminum alkoxide catalyst dissolved in an inert solvent, such as benzene, at a temperature in the range of 0° to 110° C.

A preferred diepoxide based resin comprises Bakelite® ERL 4221 supplied by Union Carbide. Other multifunctional epoxies that are expected to function in a manner similar to the preferred diepoxides include the following:

SIMPLE ALIPHATIC DIEPOXIDES dodecatriene dioxide;
dipentene dioxide;
1,2,7,8-diepoxy octane

BIS(GLYCIDYL ETHER/ESTER) EPOXIES polycondensates of epihalohydrin and diols or diacids wherein the diol/diacid may be either aliphatic or aromatic, such as adipic acid and phthallic acid;
1,4 butanediol-diglycidyl ether;
Bis-glycidyl ether of bisphenol A

CYCLOALIPHATIC DIEPOXIDES 3,4-epoxycyclohexyl-3, 4-epoxycyclohexylcarboxylate, e.g. Union Carbide's ERL 4221;
bis(c,4-epoxycyclohexylmethyl)adipate, e.g. Union Carbide's ERL 4229;
cyclooctadiene (1.5)di-epoxide;
1,2,5,6-diepoxy cyclododecane-9;
bicycloheptadiene diepoxide

MIXED ALIPHATIC AND CYCLOALIPHATIC DIEPOXIDES vinyl cyclobutene dioxide;
vinyl cyclopentadiene dioxide;
vinyl cyclohexane dioxide, e.g. Union Carbide's ERL 4206;
butanecyclobutene dioxide;
butenecyclopentene dioxide;
butadienecyclobutadiene dioxide;
butadienecyclopentadiene dioxide;
pentadienecyclobutadiene dioxide

TRI AND POLY (DI/TRI) EPOXIDES glycidyl ethers, of novalaks, e.g. Dow's D.E.R. 431 and Shell's Epox 1031;
tetraglycidyl ether of 1,1,2,2, tetrakis(4-hydroxyphenyl) ethane;
triglycidyl ether of 1,3,6-trihydroxybenzene;
triglycidyl isocyanurate (TGIC)

EPOXIDIZED DRYING AND NON-DRYING OIL ACIDS

Epoxidized tall oils, e.g. Monoplex S-73;
Epoxidized linseed oils;
Epoxidized soy bean oils, e.g. Paraplex G-62

In addition to diepoxides in combination with acids, other electrophilic reagents may be used in the gelation step (compounding step).

The gels of nitrile rigid polymer can be formed by a Ritter reaction which may involve formation of amides by addition of olefins or secondary and tertiary alcohols to nitriles in strongly acidic media. Suitable Ritter reagents include diepoxides, alkyl halides, alcohols, acid chlorides, anhydrides, ethers, α and β unsaturated acids and esters. Suitable epoxide ring opening catalysts include, amines, imidazoles, organic acids, such as carboxylic, and sulfonic acids, and mineral acids and Lewis Acids. Suitable sulfonic acids include dodecylbenzene sulfonic acid.

The process of the present invention involves compounding a nitrile copolymer with an electrophilic reagent to form polymeric gels; and optionally adding an amount of water with the product from the compounding step to reduce the color of the product. Preferably the compounding step involves compounding a melted nitrile copolymer with an electrophilic reagent to form polymeric gels. Preferably the compounding is achieved by using a melt extruder, wherein the nitrile polymer, preferably styrene acrylonitrile copolymer, is added at the upstream end of a twin screw extruder, a diepoxide such as Bakelite® ERL 4221 supplied by Union Carbide (3,4 -epoxycyclohexel-3,4-epoxycyclohexel carboxylate) is added at the upstream end of the reactor and an epoxide ring-opening catalyst, for example dodecyl sulfonic acid is also added at the upstream end of the extruder. The extruder then compounds the styrene acrylonitrile copolymer, diepoxide and sulfonic acid sufficiently to cause gel formation, and then at the downstream end of the extruder volatiles are optionally vacuumed therefrom. Suitable levels of diepoxide and sulfonic acid include for example 3.0 percent by weight diepoxide based on the total weight of nitrile polymer, and 700 parts per million dodecyl sulfonic acid based on the total weight of nitrile polymer based on the total weight of acrylonitrile polymer. If water is used, then suitable levels of water usage include for example 0.05 to 1.0 percent by weight based on the total weight of nitrile polymer.

The gels of nitrile rigid polymer may be formed by a Ritter reaction which may involve formation of amides by addition of olefins or secondary and tertiary alcohols to nitrites in strongly acidic media. Suitable Ritter reagents include diepoxides, alkyl halides, alcohols, acid chlorides, anhydrides ethers, α and β unsaturated acids and esters. Suitable epoxide ring opening catalysts include, amines, imidazoles, organic acids, such as carboxylic, and sulfonic acids, and mineral acids and Lewis Acids preferably dodecylbenzenesulphonic acid is used. Gels are defined as cross linked polymer which can be measured by solvent swell techniques and rheological methods well known in the art.

The first thermoplastic resin, may be any resin into which the nitrile gels may be sufficiently predispersed, and which is comparable in the final composition to provide the desired levels of impact strength and reduced gloss. Preferably the first thermoplastic resin is an aromatic polycarbonate resin, and more preferably is an aromatic polycarbonate resin derived from halogen free bisphenol A and a carbonate precursor such as phosgene or diphenol carbonate. Suitable other polymers for the first thermoplastic resin include polymethylmethacrylate, styrene-acrylonitrile copolymer, acrylonitrile-butadiene-styrene graft copolymer, and blends such as polycarbonate/polymethylmethacrylate/acrylonitrile-butadiene-styrene graft copolymer blends.

The second thermoplastic resin matrix may be selected from any of the resins set out above for the first thermoplastic resin. Preferably the second thermoplastic matrix resin is a blend of aromatic polycarbonate resin, acrylonitrile-butadiene-styrene graft copolymer, and rubber-free, non-gelled, styrene-acrylonitrile copolymer.

In preferred embodiments, the polymeric gel compound contains nitrile polymeric gels, and is formed by compounding an unsaturated nitrile (acrylonitrile) containing polymer preferably styrene-acrylonitrile copolymer with from about 0.01 to about 10 weight percent of the electrophilic reagent, preferably a polyepoxide and an acid in combination, based on the total weight of the unsaturated nitrile polymer (acrylonitrile polymer), and more preferably from 0.5 to about 4 weight percent thereof. In other words, the acrylonitrile polymer is compounded with an electrophilic reagent thereby undergoing a Ritter reaction and forming gels. The polymeric gel compound is then blended with a first thermoplastic resin to form a predispersed concentrate containing uniformly dispersed gels therein. By forming the concentrate, the final composition will have unexpectedly superior property averages when made by the process of the present invention. The first thermoplastic resin and the polymeric gel compound are preferably blended together in a weight ratio of first thermoplastic resin to polymeric gel compound of between 5:1 and 0.5:1 more preferably between 3:1 and 1:1.

The blending is preferably done in an extruder at a temperature range of from 450° F. to 700° F., preferably at a Specific Energy Consumption (SEC) of 0.15 to 0.30 wHn/gm.

The blending step results in the formation of a concentrate containing the first thermoplastic matrix resin and the polymeric gel compound, and containing within the concentrate a relatively uniformly dispersed concentration of polymeric gels.

The concentrate is then admixed with a second thermoplastic resin which may be the same or different from the first thermoplastic resin to consistently form a final composition having a consistent and/or reduced surface gloss and consistent and/or higher impact strength, as well as other consistent properties. The admixing is preferably done in an extruder at a SEC between 0.12 and 0.28 wHn/gm.

The final reduced gloss compositions may also include conventional additives such as antioxidants, lubricants, pigments, phosphites, halogenated fire retardant additives, phosphate flame retardants and the like. Preferably the gelation (compounding) step is free of additives which will interfere with the gelation process.

The composition preferably comprises the second thermoplastic resin at a level of from 40 to 98 percent by weight based on the total weight of the composition, more preferably from 70 to 90 percent by weight thereof, and most preferably from 75 to 85 percent by weight thereof; and the composition preferably comprises the concentrate at a level of from 2 to 60 percent by weight based on the total weight of the composition, more preferably from 5 to 30 percent by weight thereof, and most preferably from 9 to 25 percent by weight thereof. As set out above, the concentrate preferably comprises the first thermoplastic resin and the polymeric gel compound in respective weight ratios of between 5:1 to 0.5:1, more preferably between 3:1 and 1:1, and in other words, the concentrate preferably comprises the first thermoplastic resin at a level of from 33 to 83 percent by weight based on the total weight of the composition, and more preferably between 50 percent by weight and 75 percent by weight thereof; and preferably the polymeric gel compound is present in the concentrate at a level of from 17 to 67 percent by weight based on the total weight of the concentrate, and more preferably between 25 and 50 percent by weight thereof.

The actual levels and sizes of the gels within the gel compound will depend in part upon the level of electrophilic reagent employed in the production of the polymeric gel compound. The gels may be formed in presence of, or free from, non-reactive diluents. The chart of FIG. 1 labeled "SAN Gel Concentrate" illustrates the present inventions ability to yield high notched Izod impact strength values regardless of the amount of work (SEC) put into the composition. The chart labeled "Neat SAN Gels" illustrates the prior single step process.

EXAMPLES

TABLE 1

Compounding of a FR PC/ABS Alloy
Effect of Precompounding the GEL
vs using it Neat

| SAN gel form | Feed Rate (lb/hr) | Izod Impact (ftlb/in) | UL 94 flame rating (1/16" thickness) |
|---|---|---|---|
| Ex. A | 200 | 2.0 | V2 |
| Ex. B | 350 | 2.1 | V2 |
| Ex. 1 | 200 | 9.9 | V0 |
| Ex. 2 | 350 | 9.6 | V0 |

TABLE 2

Compounding of a non-FR PC/ABS Alloy
Effect of precompounding the GEL
in a Concentrate vs using it Neat

| Ex. | Gel Concentrate | Cmpdg. SEC (wHr/g) | Hunter % Gloss @ 60° | 'T Bar' Melt Fracture | Izod Impact (ftlb/in) |
|---|---|---|---|---|---|
| C | none | 0.232 | 20 | none | 10.2 |
| D | none | 0.189 | 15 | severe | 8.4 |
| E | none | 0.186 | 8 | severe | 7.5 |
| 3 | yes | 0.188 | 14 | none | 9.5 |
| 4 | yes | 0.179 | 11 | moderate | 9.3 |

Examples A and B are comparative examples and examples C, D and E are also comparative examples. Examples 1, 2, 3 and 4 are examples illustrating the process of the present invention.

Examples A, B, 1 and 2 contain the following ingredients, but were made utilizing different processes and/or process conditions. Comparative examples A and B were made without utilizing a concentrate, but rather utilized direct admixing of the polymeric gel compound into the matrix resin. Examples 1 and 2 involved preparing a concentrate by blending the polycarbonate resin and styrene-acrylonitrile gel compound in a 2:1 weight ratio to yield a concentrate which was then admixed with the remaining ingredients. The examples A, B, 1 and 2 all contain 3 percent by weight styrene-acrylonitrile gel compound based on the total weight of the compositions. Note that in Table 1 the Izod impact strength of the compositions made by the process of the present invention were substantially higher than those made by a direct admixing method not employing the concentrate of the present invention. Additionally, the flame rating as tested by UL 94, VO, V1, V2 test showed improvement from a V2 rating (1/16" thickness) to a VO rating (1/16" thickness). FIG. 1 illustrates the improved consistency of impact properties and flammability obtained by the process of the present invention over simple direct admixing of the polymeric gel compound with the remaining ingredients of the composition.

Table II illustrates that direct edition of gel compound to the matrix resin provides gloss values which are sensitive to the specific energy consumption used in extruding the products, and that by employing lower SEC levels that the gloss of the final product can be reduced, but that problems associated with T Bar melt fracture can result, and that reductions in the impact properties of the product can result. The properties obtained by the process of the present invention, are not as sensitive to the specific energy consumption employed in the process, and relatively consistent Izod impact strengths can be obtained along with desired levels of T Bar melt fracture resistance. Also note the unexpected improvement in the gloss/melt fracture balance, i.e., a lower gloss is obtained without melt fracture. The ingredients used in the formulations of the comparative Examples C, D and E, as well as in the present compositions of Examples 3 and 4 are set out as follows: Comparative Examples C, D and E and Example 3 each contain 64 percent by weight of an aromatic polycarbonate derived from bisphenol A and phosgene, 16 percent by weight of an acrylonitrile-butadiene-styrene graft copolymer, 13.3 percent by weight of a styrene-acrylonitrile copolymer, 6.7 percent by weight of a polymeric gel compound, 0.5 percent by weight of a phosphate flame retardant, 0.5 percent by weight carbon black, 0.3 percent by weight of an phenolic antioxidant, and 0.3 percent by weight of a phosphite antioxidant based on the total weight of the composition. Note the low gloss, and high impact strength of the compositions made according to the present invention. Example 4 employed a composition comprising 50.6 percent by weight of a high molecular weight bisphenol A aromatic polycarbonate, 13.34 percent by weight of a low molecular weight polycarbonate, 16.0 percent by weight of an acrylonitrile-butadiene-styrene graft copolymer, 13.3 percent by weight of a styrene-acrylonitrile copolymer, 6.7 percent by weight of a styrene-acrylonitrile polymeric gel compound, 0.5 percent by weight of a phosphate, 0.5 percent by weight carbon black, 0.3 percent by weight of a phenolic antioxidant, and 0.3 percent by weight of a phosphite.

We claim:

1. A process for making a reduced gloss thermoplastic composition, said process comprising:

(a) compounding a nitrile polymer with an electrophilic reagent to form a polymeric gel compound;

(b) blending said polymeric gel compound with a first thermoplastic resin in a weight ratio first thermoplastic resin to polymeric compound of between 5:1 and 0.5:1 to make a concentrate comprising gels dispersed in the first polycarbonate resin, and (c) admixing said concentrate with a second polycarbonate resin to produce said composition, said concentrate being used at a level of from 2 to 60 weight percent based on the total weight of said composition.

2. The process of claim 1 wherein said process consisting essentially of said compounding, blending and admixing.

3. The process of claim 1 wherein said process consisting of said compounding, blending and admixing.

4. The process of claim 1 wherein said gels are styrene-acrylonitrile gels.

5. The process of claim 1 wherein said electrophilic reagent is a combination of a polyepoxide and an acid.

6. The process of claim 5 wherein said electrophilic reagent is a combination of a diepoxide and an acid.

7. The process of claim 5 wherein said poly(epoxide) is present in an amount of from 0.01 to 10 weight percent based on the total weight of the nitrile polymer.

8. The process of claim 1 wherein said composition comprises:

(a) an aromatic polycarbonate resin present at a level of from 45 to 90 percent based on the total weight of the composition, (b) a vinyl aromatic-unsaturated nitrile-diene rubber graft copolymer present at a level of from 5 to 40 percent by weight.

9. The process of claim 8 wherein said gels are present at a level of from 1 to 25 percent by weight based on the total weight of the composition.

10. The process of claim 8 wherein said composition comprised from 0 to 40 percent by weight of non-gelled styrene-acrylonitrile copolymer.

11. The process of claim 1 wherein said process is a continuous process wherein the time between end of step (a) and the beginning of step (b) is less than 15 minutes, and the time between the end of step (b) and the beginning of step (c) is less than 5 minutes.

* * * * *